US009491414B2

(12) United States Patent
Lasko

(10) Patent No.: US 9,491,414 B2
(45) Date of Patent: Nov. 8, 2016

(54) SELECTION AND DISPLAY OF ADAPTIVE RATE STREAMS IN VIDEO SECURITY SYSTEM

(71) Applicant: Sensormatic Electronics, LLC, Boca Raton, FL (US)

(72) Inventor: Kim Lasko, Maynard, MA (US)

(73) Assignee: Sensormatic Electronics, LLC, Boca Raton, FL (US)

(*) Notice: Subject to any disclaimer, the term of this patent is extended or adjusted under 35 U.S.C. 154(b) by 235 days.

(21) Appl. No.: 14/251,079

(22) Filed: Apr. 11, 2014

(65) Prior Publication Data

US 2015/0215586 A1    Jul. 30, 2015

Related U.S. Application Data

(60) Provisional application No. 61/933,195, filed on Jan. 29, 2014.

(51) Int. Cl.
| | |
|---|---|
| *H04N 7/18* | (2006.01) |
| *H04N 9/47* | (2006.01) |
| *H04L 29/06* | (2006.01) |
| *H04L 12/26* | (2006.01) |
| *G08B 13/196* | (2006.01) |

(52) U.S. Cl.
CPC ........ *H04N 7/183* (2013.01); *G08B 13/19645* (2013.01); *H04L 43/08* (2013.01); *H04L 65/60* (2013.01); *H04L 65/607* (2013.01); *H04L 65/608* (2013.01); *H04L 65/80* (2013.01); *H04N 7/181* (2013.01)

(58) Field of Classification Search
None
See application file for complete search history.

(56) References Cited

U.S. PATENT DOCUMENTS

| | | | | |
|---|---|---|---|---|
| 5,875,304 A | * | 2/1999 | Winter | .............. G06F 17/30017 348/E5.099 |
| 5,909,548 A | * | 6/1999 | Klein | ................ G06F 17/30017 340/3.1 |
| 7,665,113 B1 | | 2/2010 | Abrams | |
| 2002/0097322 A1 | * | 7/2002 | Monroe | ........... G08B 13/19643 348/159 |

(Continued)

OTHER PUBLICATIONS

Akhshabi, Saamer, et al. "An Experimental Evaluation of Rate-Adaptation Algorithms in Adaptive Streaming over http." MMSys '11, Proceedings of the second annual ACM conference on Multimedia systems, Feb. 23-25, 2011, San Jose, CA. 12 pages.

(Continued)

*Primary Examiner* — Frederick Bailey
*Assistant Examiner* — Talha M Nawaz
(74) *Attorney, Agent, or Firm* — HoustonHogle LLP

(57) ABSTRACT

Selection and display of adaptive rate video streams in a video security system in which user devices such as mobile computing devices mix and display multiple streams concurrently from security cameras on the user devices. A client application running on the user devices determines available buffer resources on the user devices, and enables selection of one or more video streams from a grid displayed on a display of the user devices. In response to the determined resources, the client application obtains higher bit rate video streams for the selected video streams and lower bit rate video streams for the non-selected video streams. The client application then displays the higher bit rate streams in visually distinct focus panes that attract the attention of an operator and displays the lower bit rate streams in less visually distinct periphery panes. In a preferred embodiment, operators can select a stream from the periphery panes to display as higher bit rate stream in a focus pane.

23 Claims, 9 Drawing Sheets

(56) References Cited

U.S. PATENT DOCUMENTS

| | | | | |
|---|---|---|---|---|
| 2006/0053475 A1* | 3/2006 | Bezilla | G06F 21/552 | 726/1 |
| 2009/0066788 A1* | 3/2009 | Baum | G06F 17/30017 | 348/143 |
| 2009/0070477 A1* | 3/2009 | Baum | H04N 21/2187 | 709/231 |
| 2010/0097464 A1* | 4/2010 | Volpe | G08B 13/1966 | 348/143 |
| 2011/0169952 A1* | 7/2011 | Yamaguchi | H04N 19/172 | 348/143 |
| 2012/0212631 A1* | 8/2012 | Kiirenko | A61B 5/0059 | 348/207.1 |
| 2012/0307049 A1* | 12/2012 | Mimar | G08B 13/19676 | 348/143 |
| 2013/0163430 A1* | 6/2013 | Gell | H04N 21/23439 | 370/235 |
| 2013/0259228 A1* | 10/2013 | Ren | H04L 9/3247 | 380/200 |
| 2013/0307971 A1* | 11/2013 | Ganesan | H04N 7/181 | 348/143 |
| 2013/0332420 A1* | 12/2013 | Ha | G06F 17/30581 | 707/634 |
| 2015/0054947 A1* | 2/2015 | Dawes | H04L 65/607 | 348/143 |

OTHER PUBLICATIONS

Nguyen, Duc V., et al. "Adaptive Home Surveillance System using HTTP Streaming." 2013 International Joint Conference on Awareness Science and Technology & UBI-Media Computing, IEEE, Nov. 2, 2013, p. 579-583.

International Search Report and Written Opinion of the International Searching Authority, mailed on Apr. 15, 2015, from counterpart International Application No. PCT/US2015/012863, filed on Jan. 26, 2015.

International Preliminary Report on Patentability, issued on Aug. 2, 2016, from counterpart International Application No. PCT/US2015/012863, filed on Jan. 26, 2015. Thirteen pages.

* cited by examiner

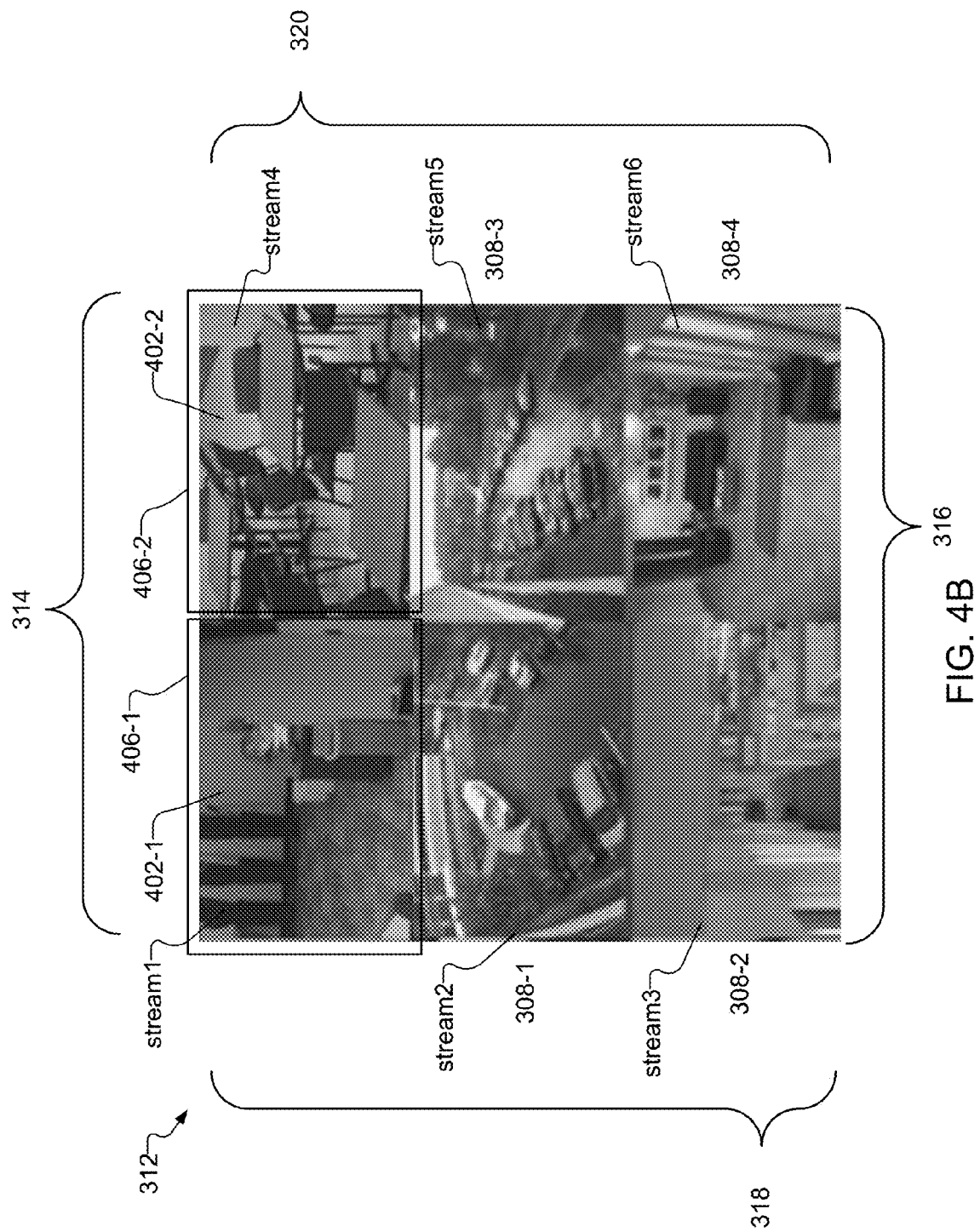

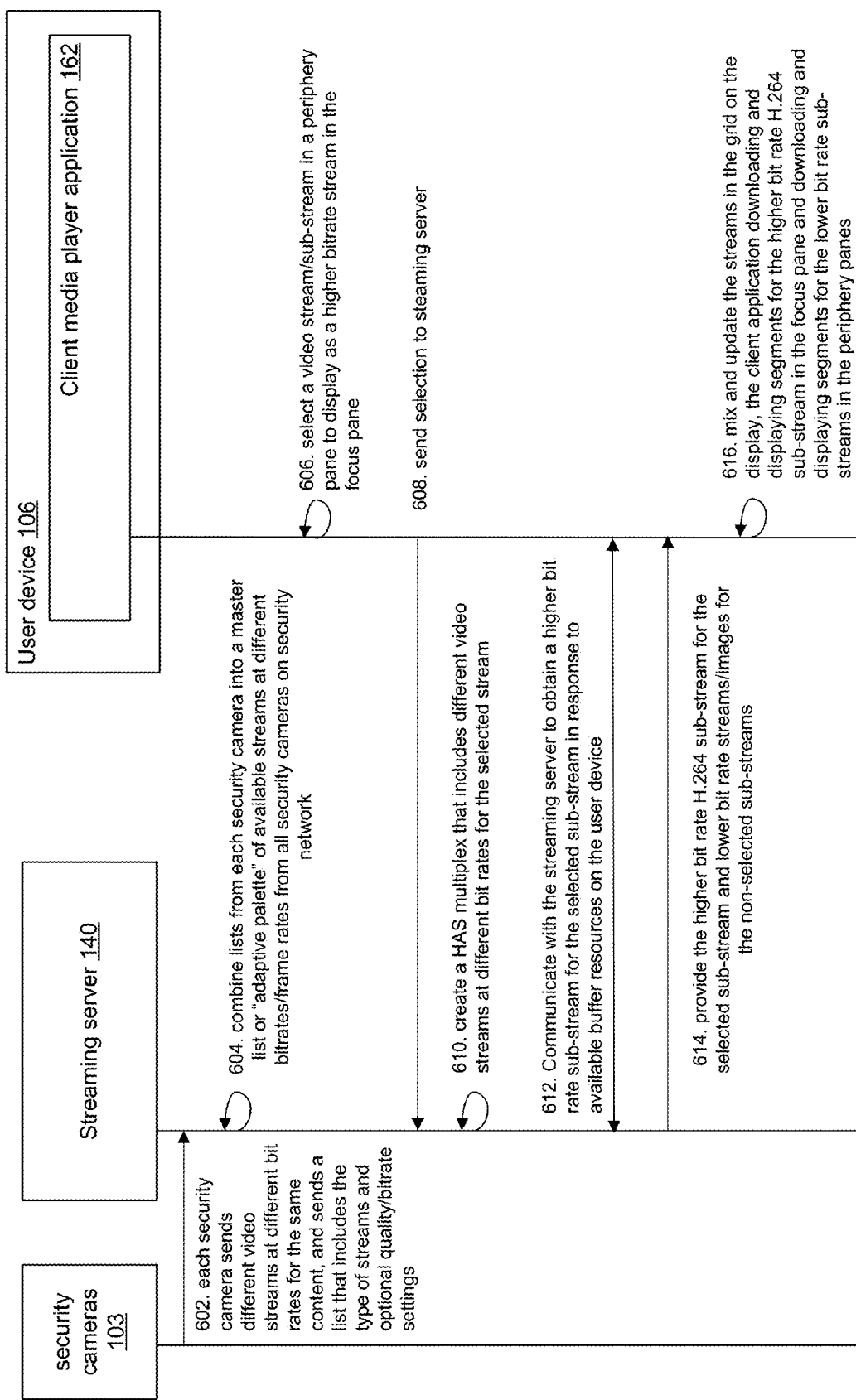

SELECTION AND DISPLAY OF ADAPTIVE RATE STREAMS IN VIDEO SECURITY SYSTEM

RELATED APPLICATIONS

This application claims the benefit under 35 USC 119(e) of U.S. Provisional Application No. 61/933,195, filed on Jan. 29, 2014, which is incorporated herein by reference in its entirety.

BACKGROUND OF THE INVENTION

Manufacturers of security systems provide security devices for public and private institutions, commercial businesses, schools, hospitals and government institutions to list a few examples. The security devices are connected to security networks installed in the customer premises. One of the most important security devices in the security network is the video camera, or security camera. Video data streams from security cameras have increasingly become the focus of security-related activities such as loss-prevention and evidence collection, in addition to surveillance.

Client devices run applications for managing and viewing video data streams from the security networks. The client devices have typically been desktop-based systems or workstations that include high-performance CPUs and provide large memory footprints. The applications on the client devices leverage the large amount of available memory and processing power in order to display and manage multiple full-rate video data streams from one or more security cameras concurrently.

The recent proliferation of inexpensive user devices for displaying video streams over public and cellular data networks has had a profound impact on the way security professionals and first responders consume and share video data from private security networks. In examples, first responders at an accident scene can capture and share video streams in real time with one another on mobile computing devices such as smart phones and police dispatchers can stream surveillance video data of a suspect to mobile computing devices of law enforcement personnel in the field.

Each of the video streams is typically displayed within a separate pane in a grid that displays on the user device. However, the limited processing power, memory, and functionality of user devices impose significant restrictions on the display of video data streams on user devices. In practice, most tablet and smart phone user devices can typically decode and display only one video data stream at a time. This presents a problem for security personnel, who typically require the ability to display multiple video data streams concurrently on the client, such as in a 2×2 grid layout. In addition, the main application that runs on these user devices is a web browser. Web browsers are more limited in their capabilities than the custom applications installed on security workstations for viewing video streams from security cameras.

Current approaches to solving the problem of displaying multiple video data streams from security cameras on client mobile computing devices have focused on server-side optimization. Typically, streaming servers within the security network perform the majority of the mixing and processing of the video data streams from the security cameras.

In a typical example of current approaches, the server decodes the video data streams ("video streams") from all security cameras, mixes them into a display grid, and then compresses the video streams into a single video data stream. The server then sends the grid including the compressed video data stream to the client mobile computing device. The client device uncompresses and displays the video streams in the display grid. This process repeats for each compressed stream transmission from the server.

SUMMARY OF THE INVENTION

While these approaches greatly reduce the complexity of tasks that the client must perform, they also have problems. One problem is that it increases complexity on the server. Existing server-based solutions require significant processing and memory resources on the streaming server for mixing the video data streams from the security cameras and compressing the streams prior to transmission to the client. This complexity increases cost and can impact time-to-market readiness.

Another problem is that media streaming servers within security networks typically have limited available bandwidth. As the number of security cameras on the security network increase, the streaming server can become a throughput bottleneck in the security network, impacting performance of the security network and the display of the video data streams.

The present invention utilizes concepts of Adaptive Bit Rate (ABR) video streaming, also known as HTTP Adaptive Streaming (HAS) between the user devices and the streaming server to overcome the server-side complexity and bottlenecks for selecting and mixing video streams of existing systems and methods. This present invention can be used to shift the burden for selecting and mixing the video streams with different bit rates to the client user devices.

Because user devices typically have fewer memory and processing resources than server-side devices, the present invention focuses the majority of the available buffer resources on the user device to display a narrow subset of the video streams at higher bit rates. The remaining video streams are displayed at lower bit rates. Preferably, in response to the available buffer resources on the user device, the client application obtains a higher bit rate video stream for a selected video stream on the client application, and obtains lower bit rate video streams for the remaining or non-selected video streams.

The decision to allocate the available buffer resources on user devices for displaying video streams in this manner is based on typical behavior patterns of security system operators. The operators typically focus their gaze on one video stream of a multi-pane display grid at a time, and only periodically glance at the remaining streams in the other panes. Accordingly, the present invention can take advantage of this behavior by displaying the video stream that is the focus of operator interest at a higher bit rate within in a focus pane, and displaying the remaining video streams at lower bit rates in periphery panes. The client application utilizes a HAS-style communication protocol between a streaming server for obtaining different video streams for the same content at different bit rates. This provides the ability to mix and display the video streams from the security cameras using client applications on the user devices without creating processing and resource bottlenecks on the client devices, thereby overcoming the problems and limitations of existing systems and methods. This solution also reduces complexity of the streaming server and places fewer resource requirements on the streaming server than existing solutions and methods.

Embodiments utilize concepts of ABR/HAS video streaming to gauge available data buffer resources on the user devices prior to selecting and displaying the different video streams at different bit rates. The client applications obtain different bit rates for the video streams displayed on the user devices in response to the determined resources on the user devices. The available buffer resources are typically determined in conjunction with current CPU utilization and available bandwidth resources on the user devices.

In one example, the system uses different bandwidth optimization techniques on a streaming server in response to video stream bit rate selection on the client user devices. The techniques utilize a HAS-style communications protocol between the client application and the streaming server.

The streaming server accepts and/or provides multiple video streams for the same content at different or varying bitrates, also known as alternate bit rate streams. The video streams typically include live video data from security cameras. When the security cameras cannot provide the video streams at the bit rates selected by the user devices, the streaming server transcodes the video streams into new video streams with the different bit rates/encoding. The streaming server builds HAS-compatible sub-streams from the different video streams, and provides the sub-streams within one or more HAS streams, also known as HAS multiplexes. The streaming server then provides the HAS multiplex including the sub-streams for the video streams to the user devices for decoding and display.

In general, according to one aspect, the invention features a video security system for selecting and displaying content on user devices and typically mobile computing devices such as tablets and smart phones, which also typically have cellular data connections. The video security system includes one or more security cameras that provide the content in video streams over a security network, and client applications executing on the user devices that display the video streams, and select a bit rate for each of the video streams. In addition, the video security system includes a streaming server that accepts the video streams from the security cameras, and provides the client applications with the video streams having different bit rates determined by the client applications.

Each of the client applications of the video security system display each of the video streams within panes of a grid on a display of the user devices, the panes including one or more periphery panes for displaying lower bit rate video streams and one or more focus panes for displaying higher bit rate video streams. The focus panes include focus pane indicators that enable the focus panes to be visually distinct from the periphery panes.

In response to selection on the client applications of video streams of the periphery panes, the client applications request the streaming server to provide higher bit rate video streams for the selected video streams and lower bit rate video streams for the video streams of the current focus panes, and display the video streams for the current focus panes in the periphery panes and the selected video streams in the focus panes.

The streaming server preferably includes a HAS transcoder, a load balancer, and a media service. The HAS transcoder accepts the video streams from the security cameras, and generates one or more HAS multiplexes that include the video streams as sub-streams of the HAS multiplexes. The load balancer operates in conjunction with the HAS transcoder to transcode the sub-streams into new sub-streams having the bit rates selected by the client applications, and places the new sub-streams within the HAS multiplexes. The media service accepts the HAS multiplexes from the HAS transcoder, generates video segments for the sub-streams of the HAS multiplexes, and provides the HAS multiplexes to each of the client applications.

In general, according to another aspect, the invention features a user device that provides selection and display of video streams from a video security system. The user device comprises a client application and a display. The client application communicates with a streaming server to obtain different video streams at different bit rates. The display displays the video streams from the client application within panes, wherein the client application enables the selection and display of the video streams within the panes.

Preferably, the panes include one or more focus panes for displaying higher bit rate video streams, and one or more periphery panes for displaying lower bit rate video streams. In examples, the focus panes are larger than the periphery panes and include focus pane indicators to enable the focus panes to be visually distinct from the periphery panes.

In a preferred embodiment, the client application, in response to selection of a video stream of any of the periphery panes, requests the streaming server to provide a higher bit rate video stream for the selected video stream and a lower bit rate video stream for the video stream for the current focus pane, and displays the video stream for the current focus pane in a periphery pane and the selected video stream in the focus pane.

In general, according to yet another aspect, the invention features a method for selecting and displaying content on user devices in a video security system. The method comprises providing the content in video streams from one or more security cameras over a security network, displaying the video streams, and selecting a bit rate for each of the video streams on client applications executing on the user devices. The method additionally comprises accepting the video streams from the security cameras and providing the client applications with the video streams having different bit rates determined by the client applications from a streaming server.

In general, according to yet another aspect, the invention features a method for selecting and displaying video streams from a video security system on a user device. The method comprises communicating with a streaming server to obtain different video streams at different bit rates from a client application running on the user device, and displaying the video streams from the client application within panes on a display of the user device, wherein the client application enabling the selecting and displaying of the video streams within the panes.

Preferably, in response to selecting a video stream of any of the periphery panes on the client application, the client application requests the streaming server to provide a higher bit rate video stream for the selected video stream and a lower bit rate video stream for the video stream for the current focus pane, and displays the video stream for the current focus pane in a periphery pane and the selected video stream in the focus pane.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4B shows a 3×3 display grid embodiment of the client application for displaying video streams and selecting a first focus pane for obtaining a higher bit rate for its associated video stream, and selecting a second focus pane for obtaining a higher bit rate of its associated video stream;

FIG. 6 is a flow diagram showing a method for selecting existing video streams on user devices to display as higher bit rate video streams on the user devices, the method utilizing HAS-compatible sub-streams created in response to selecting the streams, and selecting a higher bit rate stream from the HAS sub-streams in response to available buffer resources on the user devices;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
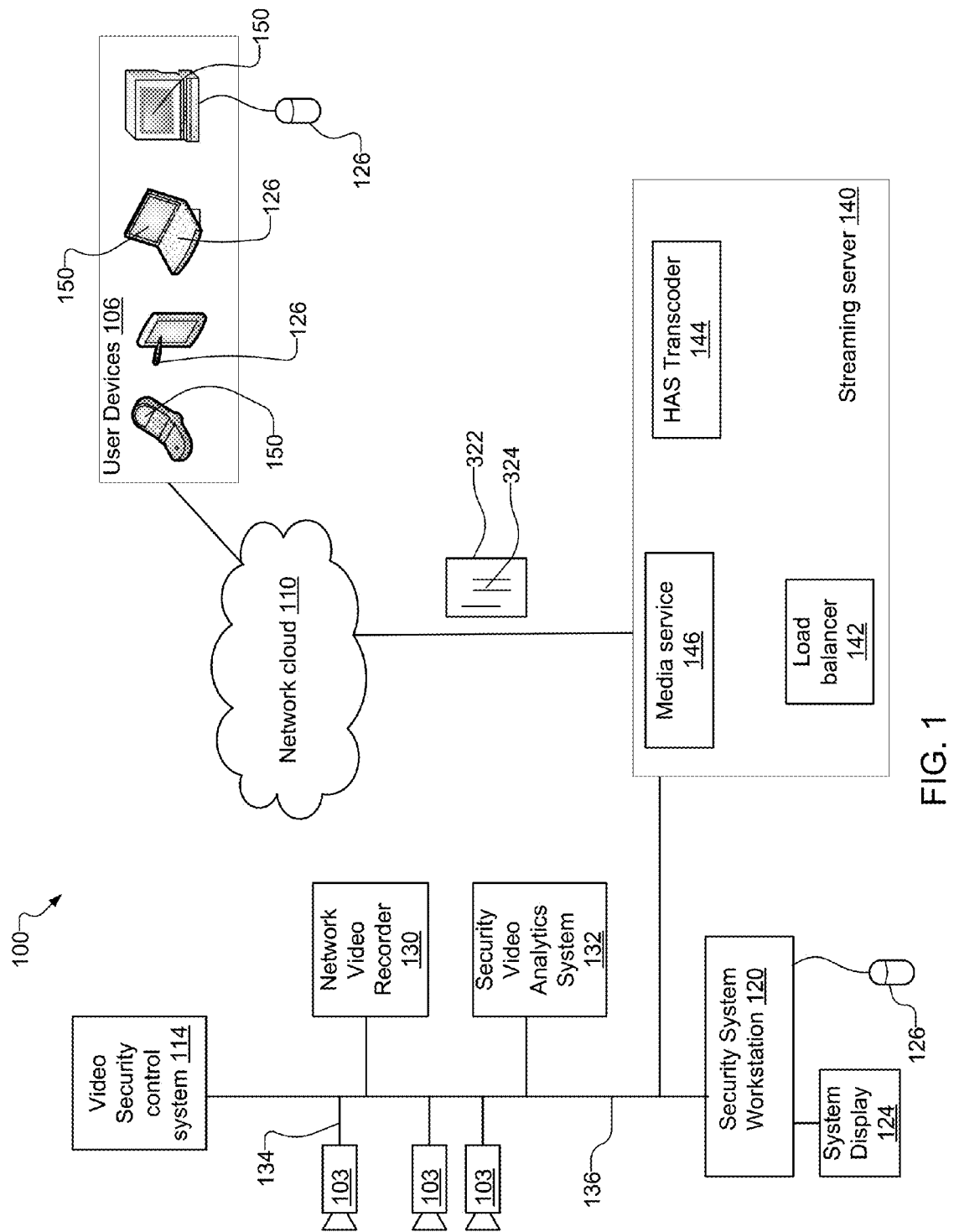
FIG. 1 is a schematic diagram of a video security system that utilizes the present invention.

FIG. 1 shows a video security system 100 that includes security cameras 103 that transmit video streams 310 over security network 136 to user devices 106. Other devices that communicate over the security network 136 typically include a video network recorder 130, a security video analytics system 132, a security system workstation 120, and a streaming server 140. These devices communicate over the security network 136 under the control of a video security control system 114. The devices communicate over the security network 136 via network interfaces 134.

User devices 106 include fixed and mobile computing devices, such as cellular phones, smart phones, and/or tablet devices communicate with the streaming server 140 over a network cloud 110 that typically include various segments including enterprise networks, service provider networks, and cellular data networks.

The user devices 106 each include a display 150. Operators interact with the user devices 106 using user input devices 126 such as a keyboard, computer mouse, tablet pens, and touch-enabled display screens, in examples.

The streaming server 140 includes a load balancer 142, a HAS transcoder 144, and a media service 146, in one implementation.

Operators configure the security cameras 103 and other devices on the security network 136 via the security system workstation 120. Operators utilize user input devices 126 such as a keyboard, mouse, or pointing device for performing configuration tasks on the security system workstation 120. Operators interact with graphical displays such as user interfaces on the system display 124 for entering the configuration information and displaying results.

Network video recorders 130 record and save video streams 310 from the security cameras 103. The security video analytics system 132 performs analysis upon frames of both live and stored/recorded video streams 310 for selected features of interest and then typical adds metadata to the stored streams.

User devices 106 issue requests through the network cloud 110 to connect to the streaming server 140. The security cameras 103 typically provide multiple streams of type H.264/AVC, but can also include MJPEG, MPEG4, or H.264/SVC, in examples.

The HAS transcoder 144 accepts the different video streams 310 from the security cameras 103. The HAS transcoder 144 (or encoder) converts the different video streams 310 from each of the security cameras 103 into corresponding HAS sub-streams 324 with different bit rates.

The HAS transcoder 144 then creates a HAS multiplex 322 associated with the sub-streams 322 created for each of the security cameras 103. Preferably, when the security cameras 103 cannot provide video streams 310 at the bit rates requested by the user devices 106, the streaming server 140 transcodes the video streams 310 into new video streams 310 having the requested bit rates.

The media service 146 accepts the HAS multiplex 322 including the sub-streams 324 from the HAS transcoder, generates video segments for the sub-streams 324, and provides the video segments for the client application 162 to mix and display on a display 150 of the user devices 106. The client applications 162 download the video segments for the streams 310/sub-streams 324, and mix and display the streams 310 on a display 150 of the user devices 106.

The load balancer 142 handles providing high-bitrate H.264 and low bitrate MJPEG2000 (MJPEG) streams, in examples. Operators select video streams 310 on the user devices 106 to request higher bit rate streams for the same content in response to security objectives.

Figure 2A:
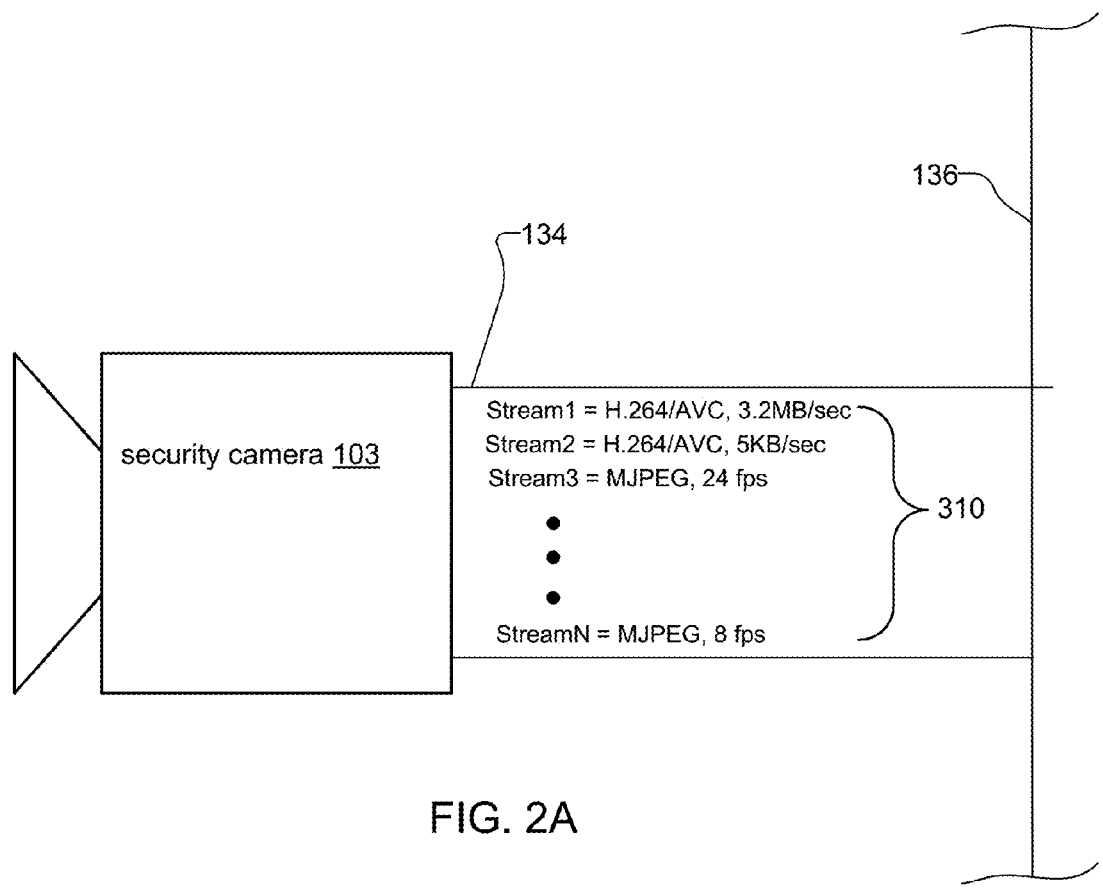
FIG. 2A is a block diagram of an exemplary security camera, illustrating the ability of the security camera to provide different video streams at different bit rates streams for types of streams such as MJPEG and H.264.

FIG. 2A shows an exemplary security camera 103 that communicates over the security network 136 via interface 134. In one example, the interface 134 is an Ethernet interface on an IP-enabled security camera 103 that communicates using IP protocols over the security network 136. Each security camera 103 provides different video streams 310 at different bit rates for the same content. The video streams 310 are typically of types H.264/AVC and H.264/SVC, MPEG4, and MJPEG, in examples.

Figure 2B:
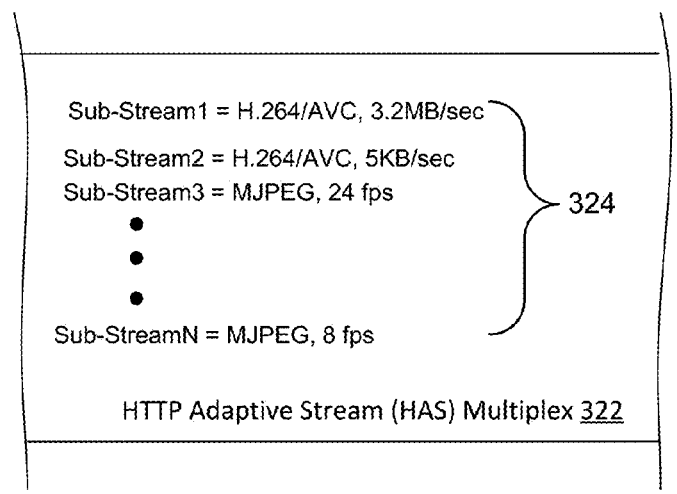
FIG. 2B is a schematic diagram showing different bit rate sub-streams created for each of the video streams from the security cameras, also known as alternate bit rate sub-streams, the alternate bit rate sub-streams included within one or more HTTP Adaptive Streaming (HAS) streams, or multiplexes.

FIG. 2B shows an exemplary HTTP Adaptive Stream (HAS) multiplex 322 that includes one or more alternate bit rate sub-streams 324. The HAS transcoder 144 accepts the video streams with different bit rates from each of the security cameras 103 as input, and preferably generates one HAS stream 322 or multiplex per security camera 103 as output. The HAS transcoder 144 generates sub-streams 324 for each of the video streams 310 received from the security cameras 103. The HAS transcoder 144 includes the sub-streams 324 created for the video streams 310 of each of the security cameras within an associated HAS multiplex 322. Current HAS protocol implementations include Apple HLS, Microsoft Smooth Streaming, and MPEG-DASH, in examples.

Each HAS multiplex 322 includes the sub-streams 324 or segments created for each of the alternate bitrate video streams 310. The alternate bit rate sub-streams 324 are typically H.264/AVC, but can be of any type. In one implementation, a HAS multiplex 322 includes one low bit rate MJPEG sub-stream 324, one high bit rate H.264 sub-stream 324, and one audio sub-stream 324. Preferably, the media service 146 of the streaming server 146 provides each HAS multiplex 322 to the client media application 162 (client application) on the user devices 106.

In examples, depending on available buffer resources on the streaming server 140, the HAS transcoder 144 can additionally create new sub-streams 324 from the sub-streams 324 of the HAS multiplex 322. The HAS transcoder 144 creates the new sub-streams 324 when the bit rates of the current sub-streams 324 do not provide the bit rates for the video streams requested by the client application. In conjunction with the HAS transcoder 144, the load balancer 146 creates the new sub-streams 324 by transcoding existing higher bit rate sub-streams 324 of type H.264 to lower resolution, reduced frame rate, and/or decreased image quality sub-streams 324. Alternatively, the HAS transcoder 144 creates the new sub-streams 324 by transcoding existing lower bit rate sub-streams 324 of type MPEG4 or MJPEP to higher resolution, increased frame rate, and/or increased image quality sub-streams 324.

Figure 3A:
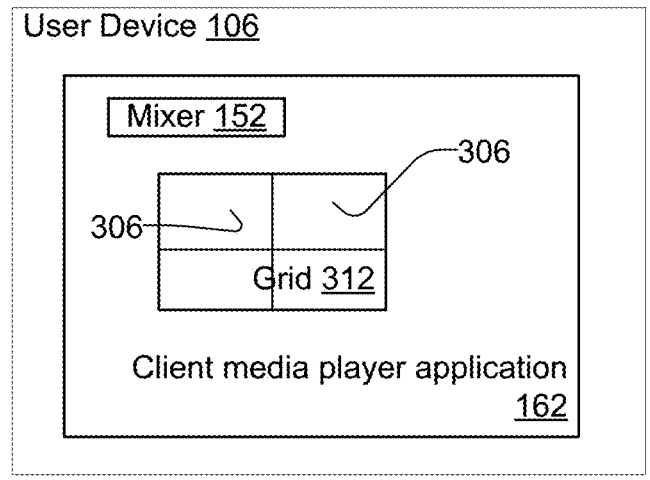
FIGS. 3A and 3B show example embodiments of client applications on user devices for selection and display of video streams on a display of the user devices, with FIG. 3A showing a stand-alone client application running on a user device, and FIG. 3B showing a client application running within a web browser on the user device.
Figure 3B:
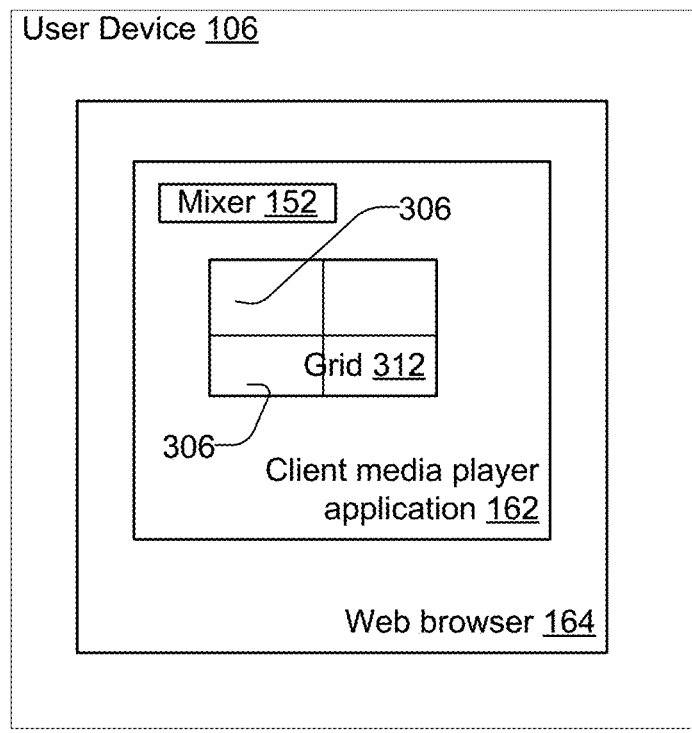

FIGS. 3A and 3B show different embodiments of a client media player application 162, or client application, for displaying and selecting video streams 310 within panes 306 of a grid 312 on a display 150 of a user device 106. In FIG. 3A, the client application 162 is a stand-alone application, such as a native application or Java application using the Java programming language, in examples. Java is a registered trademark of Oracle, Inc. In a typical example, the client application 162 communicates with the streaming server 140 over network cloud 110 using a proprietary application protocol that sits on top of a TCP/IP transport layer.

The client media player application 162 accepts one or more HAS streams/HAS multiplexes 322 from the media service 146. The client application 162 preferably includes a mixer 152 that accepts and mixes the alternative bit rate sub-streams 324 of each HAS multiplex 322. The mixer 152 also creates a pane 306 for each of the video streams 308, and a grid 312 to display each of the sub-streams 324 within its own pane 306 of the grid 312. Each of the panes 306 is typically associated with one HAS multiplex 322, where each of the panes display and enable selection of the sub-streams 324 of their associated HAS multiplex 322.

FIG. 3B shows the client application 162 running within a web browser 164. In examples, the client application 162 and its mixer 152 and grid 312 are implemented as part of a Java applet or as a script using Javascript. The web browser 164 communicates with the streaming server 140 using the HTTP protocol. Commands from the client application 162 are encapsulated in HTTP messages.

Figure 4A:
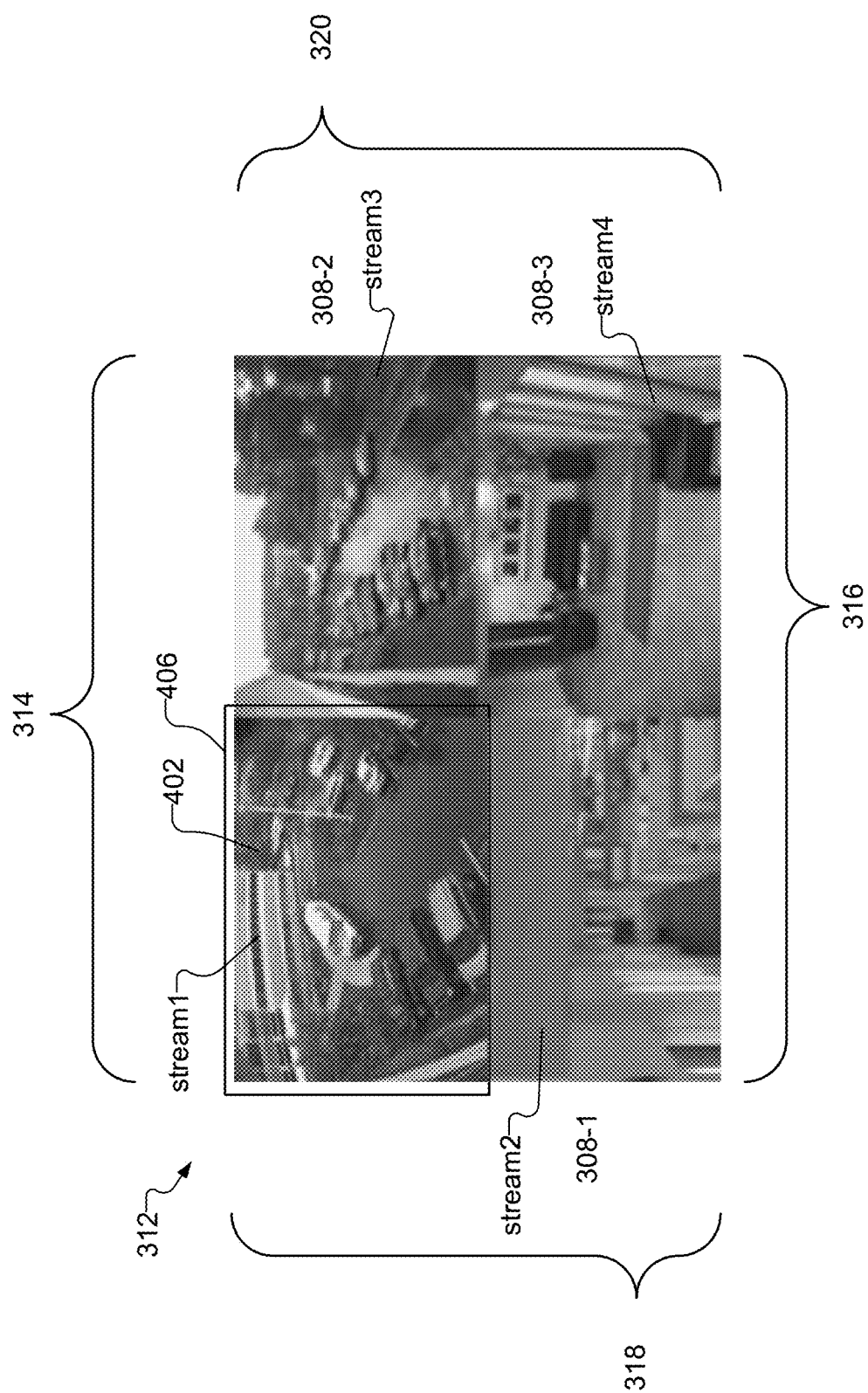
FIG. 4A shows a 2×2 display grid embodiment of the client application for displaying video streams and selecting a focus pane for obtaining a higher bit rate for its associated video stream.

FIG. 4A shows one embodiment of the client application 162 for displaying video streams 310 within panes 306 of grid 312. The grid 312 in this example is a 2×2 matrix that at any time includes three lower bitrate video streams 310, such as MJPEG streams, labeled stream2, stream3, and stream4, displayed in periphery panes 308-1, 308-2, and 308-3, respectively, and a higher bit rate video stream 310 displayed within a focus pane 402. The grid 312 has a top edge 314, bottom edge 316, left edge 318, and right edge 320. In this example, the focus pane 402 and the periphery panes 308 are the same size, and the focus pane 402 is adjacent to the left edge 318 and the top edge 314 of the grid 312.

Focus pane 402 downloads video segments from higher bitrate sub-streams 324 of the HAS multiplex 322 associated with the focus pane 402. The client application 162 displays the grid 312 including the periphery panes 308 and their video streams 310/sub-streams 324, and the focus pane(s) 402 and their video streams 310/sub-streams 324 on the display 150 of the user devices 106.

The focus pane indicator 406 highlights or otherwise visually sets apart the focus pane 402 from the periphery panes 308. In one implementation, the client application 162 provides a colored selection rectangle around the focus pane(s) 402 in order to indicate to the operator which of the panes 306 include the focus video stream 310. When there is more than one focus pane 402, the client application 162 can provide the operator with the ability to prioritize the focus (e.g. most recently selected).

The periphery panes 308 download video segments from lower bitrate sub-streams 324 of their associated HAS multiplexes 322. This scheme saves bandwidth on the client media player application 162.

In one example, the frame rate of the video streams 310 downloaded to the periphery panes 308 is 24 fps or lower, which is the minimum frequency required to eliminate the perception of moving frames for the human eye. Setting the video streams of the periphery panes 308 to use a lower threshold fps such as 24 fps provides more bandwidth for the video stream of the focus pane 402. The client application 162 then requests a higher available bitrate for the stream of the focus pane 402, determined by an available buffer and/or bandwidth resources of the user device 106.

In a preferred embodiment, all periphery panes 308 automatically download lower-bit rate MJPEG streams of the same low frame rate, such as 16 frames per second (fps) or less, and the focus panes 402 download higher-bit rate H.264 streams in response to available buffer resources on the user devices 106.

Though the display of the video streams 310 in the periphery panes 308 may experience "flicker" or pauses between frame updates at lower frame rates using this scheme, their video streams are of much less importance to the operator than the stream of the focus pane 402. This enables concurrent display and mixing of multiple video streams on the client media player application 162 while providing the higher bitrate of the stream in the focus pane 402 in response to bandwidth and buffer resources available on the user device 162.

FIG. 4B shows another embodiment of the client application 162 for displaying its grid 312 of video streams 310. The exemplary grid 312 is a 3×3 matrix that at any given time includes four low bit rate MJPEG streams 310, labeled stream2, stream3, stream5, and stream6. Streams 2 through 5 are displayed in periphery panes 308-1, 308-2, and 308-3, and 308-4, respectively. In this embodiment, segments for higher bit rate sub-streams 324, labeled as stream1 and stream4, are downloaded by the client application 162 and displayed in first focus pane 402-1 and second focus pane 402-2.

As in the exemplary grid 312 of FIG. 4A, the focus panes 402 and the periphery panes 308 in FIG. 4B are the same size. Focus panes 402-1 and 402-2 are placed adjacent to one another and with respect to the top 314 of the grid 312. Focus pane indicators 406-1 and 406-2 associated with focus panes 402-1 and 402-2 highlight or otherwise visually set apart the focus panes 402 from the periphery panes 308. This embodiment illustrates the ability to apportion the majority of the available buffer resources on the user device 106 between two higher bit rate streams 310 displayed in the first focus pane 402-1 and the second focus pane 402-2, respectively.

Figure 5A:
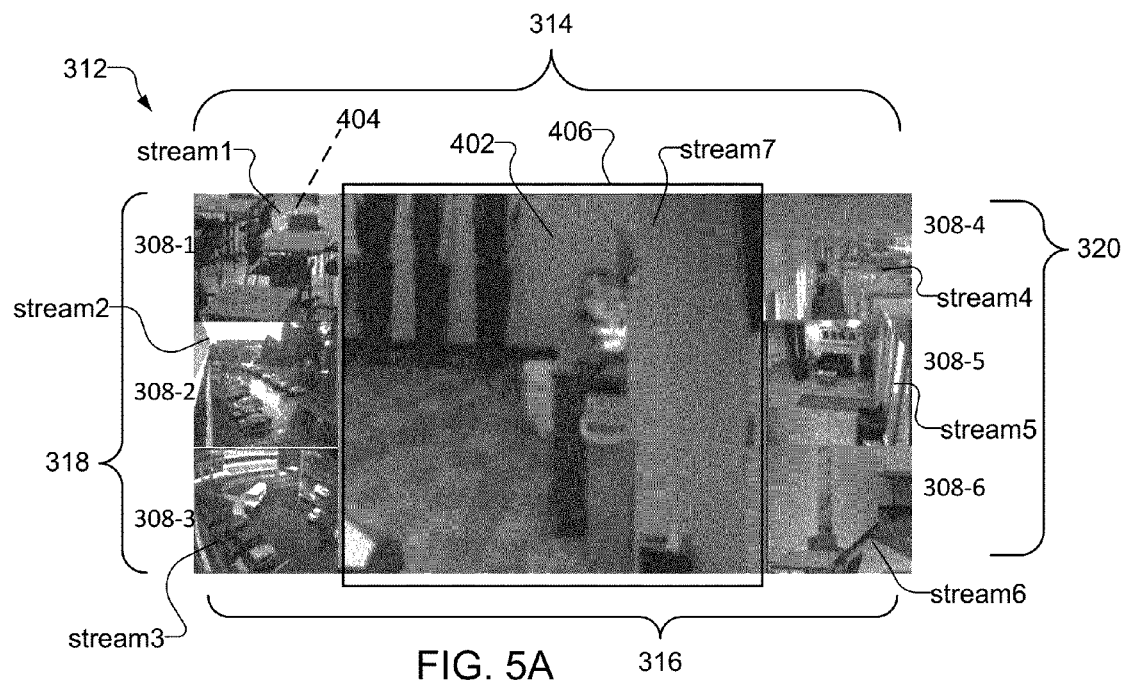
FIGS. 5A and 5B show another embodiment of the display grid with an enlarged focus pane with respect to its periphery panes, with FIG. 5A showing selection of a video stream in a periphery pane for displaying in the focus pane, and FIG. 5B showing, in response to the selection, the video stream for the current focus pane displayed in a periphery pane, and the selected video stream displayed in the focus pane.

FIG. 5A shows another embodiment of the client application 162 for its grid 312 of video streams 310. The exemplary grid 312 shows an oversized focus pane 402 relative to the size of the periphery panes 308 for displaying stream7 as a higher bit rate stream 310. The grid 312 shows periphery panes 308-1 through 308-6 for displaying lower bit rate video stream 310 stream1 through stream6, respectively. The lower bit rate video streams 310 are typically MJPEG streams. In this example, the oversized focus pane 402 is centered with respect to the left edge 318 and the right edge 320 of the grid 312, and the relatively smaller periphery panes 308 surround the focus pane 402 at the left edge 318 and the right edge 320 of the grid 312. In addition, focus pane indicator 406 highlights or otherwise visually sets apart the focus pane 402 from the periphery panes 308.

Experimentation has shown that lower frame rate, low-resolution video frame images of high quality can be constructed from higher bit rate video data sub-streams 324 using the HAS transcoder 144 on the streaming server 140 with minimal performance impact to the streaming server 140. In one example, streaming server 140 can fabricate a set of MJPEG individual JPEG images or "thumbnails" from a higher bit rate sub-stream 324 such as an H.264 encoded stream. The client application 162 successively pulls and displays the MJPEG lower bit rate frames or segments in sequence.

Alternatively, the HAS transcoder 144 can also fabricate high-resolution sub-streams 324 from low frame rate sub-streams 324 such as MJPEG frames with minimal performance impact to the streaming server 140.

Figure 5B:
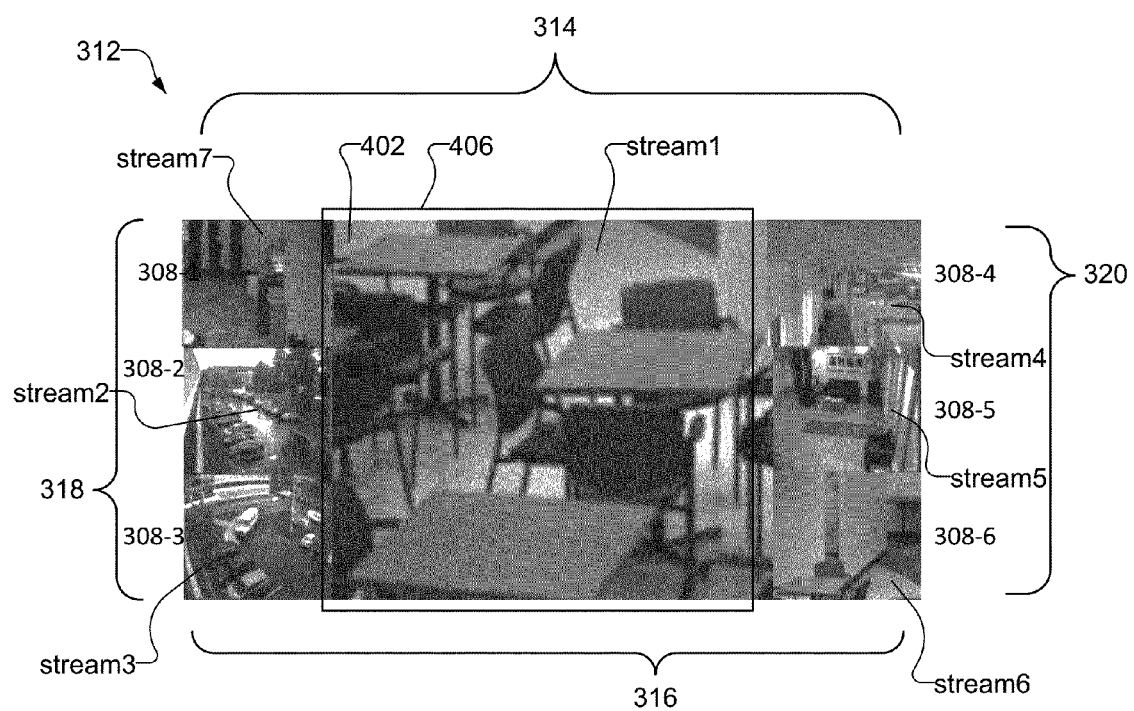

Also in FIG. 5A, an operator on the client application 162 selects stream1 in periphery pane 308-1 to display as a higher bitrate stream 310 in the focus pane 402. Reference 404 indicates the selection. FIG. 5B shows how the client application 162 updates the display of the video streams 310 in response to the selection, within the panes 306 of the grid 312 on the user devices 106.

In FIG. 5B, stream7, the video stream 310 previously displayed in focus pane 402 of FIG. 5A, is now displayed as a lower bit rate stream in periphery pane 308-1. Selected video stream 404, stream1 from FIG. 5A, is now displayed in the focus pane 402 of FIG. 5B as a higher bit rate stream 310.

FIG. 6 is a flow diagram showing a method for selecting and displaying video streams 310 with different bit rates on user devices 106. The method preferably utilizes HTTP Adaptive Streaming (HAS) between the client application 162 and the streaming server 140.

In step 602, each security camera 103 provides different video streams at different bit rates for the same content. Preferably, each security camera 103 provides one or more streams 310 of higher bit rate H.264 streams and one or more lower bit rate MJPEG streams/images. Each security camera also provides a list to the streaming server 140 that includes the types of streams and optional quality/bitrate settings available for its provided streams 310. In step 604, the streaming server 140 combines the lists from each security camera 103 into a master list or "adaptive palette" of available streams 310 at different bitrates/frame rates from all security cameras 103 on the security network 136.

According to step 606, an operator using client application 162 on a user device 106 selects a low-bitrate MJPEG stream 310 in a periphery pane 308 of the grid 312 to display as a high bit rate stream in the focus pane 402. In step 608, the client application sends the selection 404 to the streaming server 140.

In step 610, the streaming server 140 creates a HAS multiplex 322 that includes different video streams at different bit rates for the selected stream 404.

Then, in step 614, the client application 162 communicates with the streaming server using a HAS-style communications protocol. The client application 162 communicates with the streaming server 140 to obtain a higher bit rate sub-stream for the selected sub-stream in response to available buffer resources on the user device 106.

In step 616, the streaming server 140 provides a higher bit rate H.264 sub-stream for the selected sub-stream and lower bit rate streams/images for the non-selected sub-streams. Finally, in step 616, the client application 162 mixes and updates the streams in the grid 312 on the display 150. The client application 162 downloads and displays video segments for the higher bit rate H.264 sub-stream in the focus pane 402 and downloads and displays video segments for the lower bit rate sub-streams 324 of the non-selected video streams 310 in the periphery panes 308.

Note that the client/server interaction provided by the HAS-style communications protocol between the client application 162 and the streaming server 140 of step 612 differs from the behavior of standard HAS protocols such as HLS, Smooth Streaming, and MPEG-DASH. Typically, these protocols include a streaming server that is 'dumb' or 'unintelligent' because in these protocols, the client performs all the decision making for which streams 310 to select and the bit rates to request for the streams 310. In contradistinction, the streaming server 140 is more intelligent, providing the ability for the client application 162 and the streaming server 140 to 'talk' or 'negotiate'. In examples, the negotiation between the client application 162 and the streaming server 140 can include asking for additional sub-streams 324, or indicating to the streaming server what streams it is using. This allows the streaming server 140 to reduce the number of alternate bitrate streams 310 to include only those used by each client application 162 on each user device 106.

Figure 7:
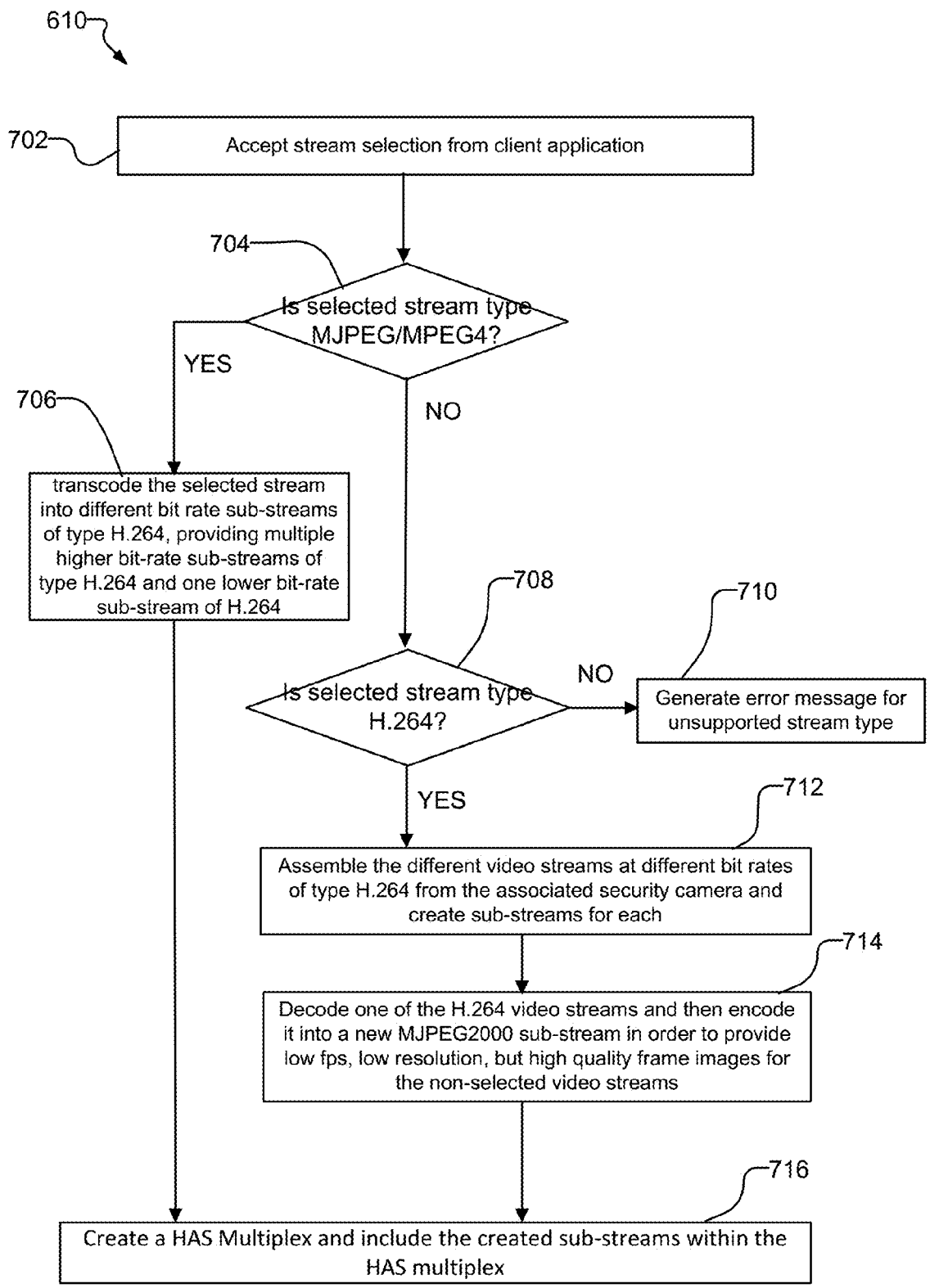
FIG. 7 is a flow chart that provides detail for the server-side creation in FIG. 6 of a HAS multiplex that includes different video streams at different bit rates in response to selection of the video streams on the user devices.

FIG. 7 provides detail for method step 610 of FIG. 6.

In step 702, the streaming server 140 accepts the stream selection 404 from the client application 162. The streaming server 140 in steps 704 and 708 checks the stream type of the selected stream 404 in order to create different sub-streams at different bit rates based on the stream type of the selected stream 404. The security cameras 103 provide higher bit rate video streams of type H.264 such as H.264/AVC and H.264/SVC, and lower bit rate streams/images of types MJPEG and MPEG4, in examples.

In step 704, the streaming server 140 determines if the stream type of the selected stream 404 is of type MJPEP or MJPEG4. If the result is true, in step 706, the HAS transcoder 144 of the streaming server 140 transcodes the selected stream into different bit rate sub-streams of type H.264, providing multiple higher bit-rate sub-streams of type H.264 and one lower bit-rate sub-stream of H.264. Upon the conclusion of step 706, the method transitions to step 716, which creates a HAS Multiplex 322 and includes the created sub-streams 324 within the HAS multiplex 322.

If the result of step 704 is not true, the method transitions to step 708. In step 708, the streaming server 140 determines if the stream type of the selected stream 404 is of type H.264. If this is not the case, the method transitions to step 710 to indicate an error condition associated with an unsupported stream type. Otherwise, the method transitions to step 712 to assemble the different video streams at different bit rates of type H.264 from their associated security camera 103 and create sub-streams 324 for each. Then, in step 714, the HAS transcoder 144 decodes one of the H.264 video streams and then encodes it into a new MJPEG2000 sub-stream in order to provide low fps, low resolution, but high quality frame images for the non-selected video streams. Finally, in step 716, the streaming server 140 creates a HAS Multiplex 322 and includes the created sub-streams 324 within the HAS multiplex 322.

Figure 8:
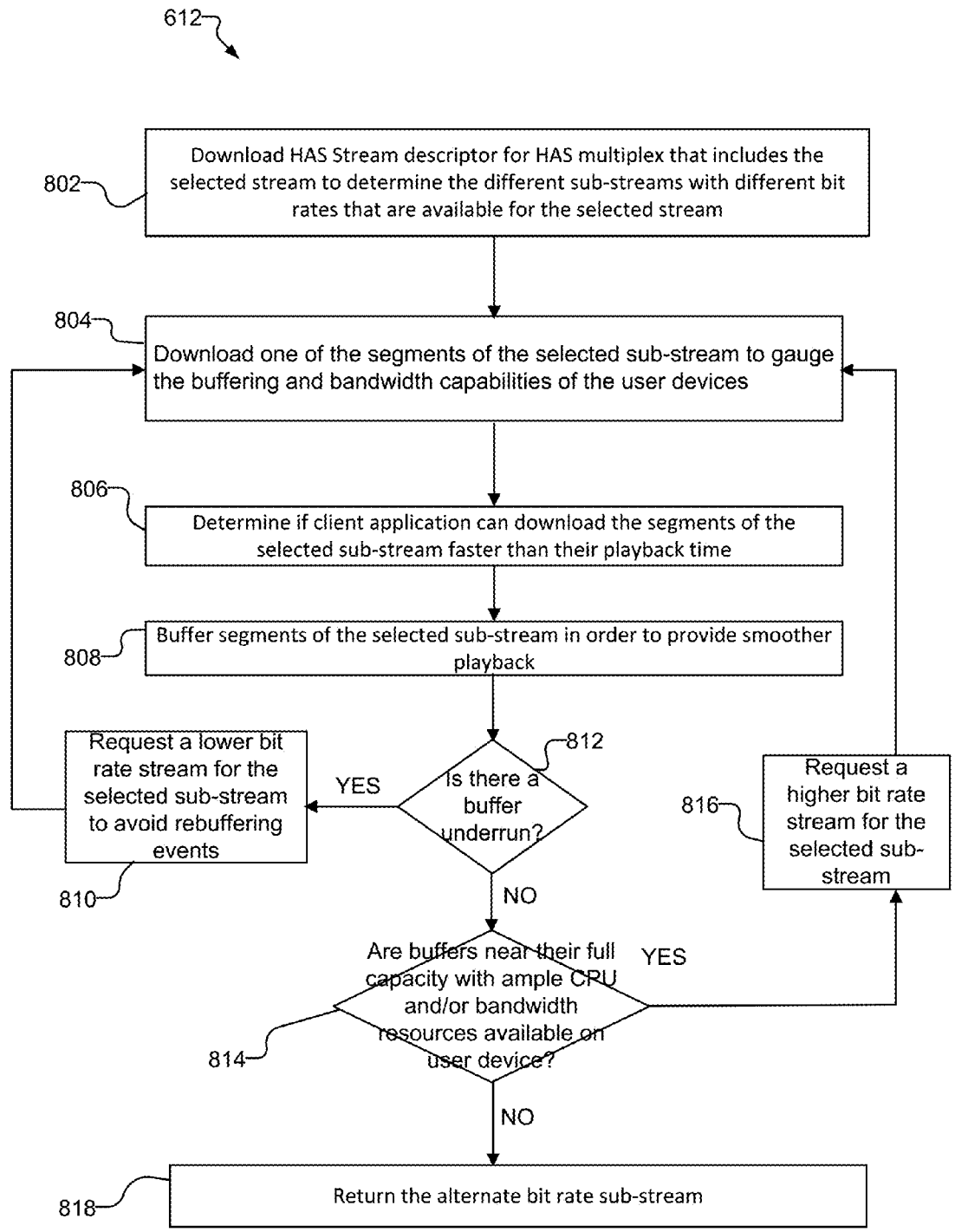
FIG. 8 is a flow chart that provides detail for a HAS-style communications protocol that provides communications between the client application and the streaming server of FIG. 6 for obtaining the higher bit rate sub-stream for the selected video stream on the user device in response to available buffer resources on the user device.

FIG. 8 provides detail for method step 612 of FIG. 6. In FIG. 8, an exemplary HAS-style communications protocol provides communication between the client application 162 and the streaming server 140 for obtaining a higher-bit rate video stream on the client application 162 in response to available buffer resources on the user device 106.

In step 802, the client application downloads a HAS Stream descriptor for a HAS multiplex 322 that includes the selected stream 404 to determine the different sub-streams 324 with different bit rates that are available for the selected stream 404. In step 804, the client application 162 downloads one of the segments of the selected sub-stream 404/324 to gauge the buffering capabilities of the user devices 106. In step 806, the client application 162 determines if it can download the segments of the selected sub-stream faster than their playback time. In step 808, the client application 162 buffers segments of the selected sub-stream in order to provide smoother playback.

Then, according to step 812, the client application 162 first determines if frequent rebuffering is occurring by testing for buffer underruns/underflows. This typically occurs when the buffers of the client application 162 are fed data at a lower speed than their playback speed. If buffer underruns are occurring, the client application 162 transitions to step 810 to request a lower bit rate stream for the selected sub-stream 404/324 to address the rebuffering events. Step 810 transitions to step 804 to complete this process in response to the available buffer resources.

If buffer underruns are not occurring, step 812 transitions to step 814 to test if the buffers are full or nearing full capacity. When the buffers are full or nearly at full capacity and there are ample available CPU and/or bandwidth resources still available on the user devices 106, this allows the client application 162 in step 816 to request a higher bit rate stream for the selected sub-stream 404. Step 814 transitions to step 816 to complete this process in response to the available buffer resources.

When the condition of step 814 is not met, indicating that a sufficient alternate bit rate sub stream has been determined for the selected stream in response to available buffer resources on the user device, step 814 transitions to step 818 to return the alternate bit rate sub-stream.

While this invention has been particularly shown and described with references to preferred embodiments thereof, it will be understood by those skilled in the art that various changes in form and details may be made therein without departing from the scope of the invention.

What is claimed is:

1. A video security system for selecting and displaying content on user devices, comprising:
   one or more security cameras that provide the content in video streams over a security network;
   client applications executing on the user devices that display the video streams, and select a bit rate for each of the video streams; and
   a streaming server that accepts the video streams from the security cameras, and provides the client applications with the video streams having different bit rates determined by the client applications;
   wherein each of the client applications displays each of the video streams within panes of a grid on a display of the user devices, the panes including one or more periphery panes for displaying lower bit rate video streams and one or more focus panes for displaying higher bit rate video streams, the client applications, in response to users selecting a video stream, requesting the streaming server to provide a higher bit rate video stream for the selected video stream and a lower bit rate for another video stream.

2. The system of claim 1, wherein the client applications select bit rates for each of the video streams in response to buffer resources available for each of the video streams on each of the user devices, and in response, the streaming server provides the video streams at the selected bit rates.

3. The system of claim 1, wherein the streaming server provides the video streams as sub-streams within an HTTP Adaptive Streaming (HAS) multiplex.

4. The system of claim 1, wherein each of the client applications include a mixer that accepts the video streams, creates a pane for each of the video streams within a grid, and displays each of the video streams within each of the panes of the grid on a display of the user devices.

5. The system of claim 1, wherein the streaming server includes:
a HAS transcoder that accepts the video streams from the security cameras, and generates one or more HAS multiplexes that include the video streams as sub-streams of the HAS multiplexes;
a load balancer that operates in conjunction with the HAS transcoder to transcode the sub-streams into new sub-streams having the bit rates selected by the client applications, and places the new sub-streams within the HAS multiplexes; and
a media service that accepts the HAS multiplexes from the HAS transcoder, generates video segments for the sub-streams of the HAS multiplexes, and provides the HAS multiplexes to each of the client applications.

6. The system of claim 5, wherein the HAS transcoder transcodes the sub-streams into the new sub-streams having the bit rates selected by the client applications when the bit rates of the sub-streams do not match the bit rates for the video streams selected by the client applications.

7. The system of claim 1, wherein the client applications operate within web browsers running on the user devices.

8. A video security system for selecting and displaying content on user devices, comprising:
one or more security cameras that provide the content in video streams over a security network;
client applications executing on the user devices that display the video streams, and select a bit rate for each of the video streams; and
a streaming server that accepts the video streams from the security cameras, and provides the client applications with the video streams having different bit rates determined by the client applications;
wherein each of the client applications displays each of the video streams within panes of a grid on a display of the user devices, the panes including one or more periphery panes for displaying lower bit rate video streams and one or more focus panes for displaying higher bit rate video streams.

9. The system of claim 8, wherein the focus panes include focus pane indicators that enable the focus panes to be visually distinct from the periphery panes.

10. The system of claim 8, wherein in response to selection on the client applications of video streams of the periphery panes, the client applications request the streaming server to provide higher bit rate video streams for the selected video streams and lower bit rate video streams for the video streams of the current focus panes, and display the video streams for the current focus panes in the periphery panes and the selected video streams in the focus panes.

11. A user device that provides selection and display of video streams from a video security system, comprising:
a client application that communicates with a streaming server to obtain different video streams at different bit rates; and
a display that displays the video streams from the client application within panes, wherein the client application enables the selection and display of the video streams within the panes;
wherein the client application displays each of the video streams within panes of a grid on the display, the panes including one or more periphery panes for displaying lower bit rate video streams and one or more focus panes for displaying higher bit rate video streams, the client application, in response to users selecting a video stream, requesting the streaming server to provide a higher bit rate video stream for the selected video stream and a lower bit rate for another video stream.

12. The user device of claim 11, wherein the client application includes a mixer that determines available buffer resources of the user device.

13. The user device of claim 12, wherein the client application obtains the different video streams at different bit rates in response to the determined resources.

14. The user device of claim 11, wherein content of the video streams is created by security cameras that communicate over a security network of the video security system.

15. The user device of claim 11, wherein the client application includes a mixer that mixes each of the video streams by accepting the videos streams from the streaming server, creating each of the panes in response to each of the video streams, and by creating a grid that includes the panes.

16. The user device of claim 11, wherein the client application communicates with the streaming server using HTTP Adaptive Streaming (HAS) to obtain the different video streams at the different bit rates, and wherein the streaming server provides the video streams to the client application as sub-streams within one or more HAS multiplexes.

17. A user device that provides selection and display of video streams from a video security system, comprising:
a client application that communicates with a streaming server to obtain different video streams at different bit rates; and
a display that displays the video streams from the client application within panes, wherein the client application enables the selection and display of the video streams within the panes; and
wherein the panes include one or more focus panes for displaying higher bit rate video streams, and one or more periphery panes for displaying lower bit rate video streams.

18. The user device of claim 17, wherein the focus panes are larger than the periphery panes to enable the focus panes to be visually distinct from the periphery panes.

19. The user device of claim 17, wherein the focus panes include focus pane indicators that enable the focus panes to be visually distinct from the periphery panes.

20. The user device of claim 17, wherein the client application, in response to selection of a video stream of any of the periphery panes, requests the streaming server to provide a higher bit rate video stream for the selected video stream and a lower bit rate video stream for the video stream for the current focus pane, and displays the video stream for the current focus pane in a periphery pane and the selected video stream in the focus pane.

21. A user device that provides selection and display of video streams from a video security system, comprising:
a client application that communicates with a streaming server to obtain different video streams at different bit rates; and
a display that displays the video streams from the client application within panes, wherein the client application enables the selection and display of the video streams within the panes; and
wherein the panes include one focus pane for displaying a higher bit rate video stream, and one or more periphery panes for displaying lower bit rate video streams.

22. A method for selecting and displaying content on user devices in a video security system, comprising:
providing the content in video streams from one or more security cameras over a security network;

selecting a bit rate for each of the video streams on client applications executing on the user devices, which display the video streams;

providing the client applications with the video streams having different bit rates determined by the client applications;

the client applications displaying each of the video streams within panes of a grid on a display, the panes including one or more periphery panes for displaying lower bit rate video streams and one or more focus panes for displaying higher bit rate video streams, and in response to users selecting a video stream, requesting a streaming server to provide a higher bit rate video stream for the selected video stream and a lower bit rate for another video stream.

23. A method for selecting and displaying video streams from a video security system on a user device, the method comprising:

communicating with a streaming server to obtain different video streams at different bit rates from a client application running on the user device;

displaying the video streams from the client application within panes on a display of the user device, wherein the client application enables the selecting and displaying of the video streams within the panes; and in response to selecting a video stream of any of the periphery panes on the client application, the client application requesting the streaming server to provide a higher bit rate video stream for the selected video stream and a lower bit rate video stream for the video stream for the current focus pane, and displaying the video stream for the current focus pane in a periphery pane and the selected video stream in the focus pane.

* * * * *